United States Patent
Belluati et al.

(10) Patent No.: US 9,061,927 B2
(45) Date of Patent: Jun. 23, 2015

(54) APPARATUS AND METHOD FOR DISINFECTING WATER

(76) Inventors: Mario Belluati, Brescia (IT); Giorgio Colombi, Collebeato (IT); Enrico Danesi, Montichiari (IT); Nicola Donnini, Cremona (IT); Giuseppe Petrucci, Monterondo (IT); Massimiliano Rosellini, Castegnato (IT)

( * ) Notice: Subject to any disclaimer, the term of this patent is extended or adjusted under 35 U.S.C. 154(b) by 1374 days.

(21) Appl. No.: 12/734,877

(22) PCT Filed: Dec. 16, 2008
(Under 37 CFR 1.47)

(86) PCT No.: PCT/EP2008/010685
§ 371 (c)(1),
(2), (4) Date: Aug. 17, 2011

(87) PCT Pub. No.: WO2009/077160
PCT Pub. Date: Jun. 25, 2009

(65) Prior Publication Data
US 2012/0000862 A1    Jan. 5, 2012

(30) Foreign Application Priority Data
Dec. 19, 2007 (IT) .............................. MI2007A2388

(51) Int. Cl.
*C02F 1/76* (2006.01)
*C01B 11/02* (2006.01)

(52) U.S. Cl.
CPC ................ *C02F 1/76* (2013.01); *C01B 11/024* (2013.01); *C01B 11/025* (2013.01); *C02F 2209/40* (2013.01)

(58) Field of Classification Search
CPC ............... C02F 1/50; C02F 1/68; C02F 1/76; C02F 1/763; C02F 2209/29; C02F 2209/40; C01B 11/022; C01B 11/023; C01B 11/025; C01B 11/024
See application file for complete search history.

(56) References Cited

U.S. PATENT DOCUMENTS

| | | | |
|---|---|---|---|
| 4,251,224 A * | 2/1981 | Cowley et al. | ................ 423/477 |
| 4,414,193 A | 11/1983 | Fredette | |
| 4,534,952 A | 8/1985 | Rapson | |
| 2003/0138371 A1 | 7/2003 | McWhorter | |
| 2005/0244328 A1 * | 11/2005 | Schmitz et al. | ............... 423/477 |

FOREIGN PATENT DOCUMENTS

| | | | |
|---|---|---|---|
| EP | 1 647 525 A | | 4/2006 |
| GB | 2 155 459 A | | 9/1985 |

OTHER PUBLICATIONS

ITRM 2004-0567 to Belluati (translation and publication) Feb. 2005.*
Bib publication data for ITRM 2004-0567 (obtained from espacenet May 2014).*

* cited by examiner

*Primary Examiner* — Lucas Stelling
(74) *Attorney, Agent, or Firm* — R. Neil Sudol; Henry D. Coleman

(57) ABSTRACT

An apparatus for on-site production of disinfectant/oxidizing products, arranged directly in the fluid to be processed, and a method for oxidation/disinfection of the affected water in order to avoid microbiological proliferation phenomena, which can cause hygienic and sanitary problems or problems of failed efficiency of systems. The apparatus for disinfecting water with on-site production of oxidizing/disinfecting products at the desired concentrations includes storage tanks for chemical reagents, pumps and pipes for connection, and a source of disinfectant and oxidizing products that is immersed in the water to be disinfected.

1 Claim, 2 Drawing Sheets

APPARATUS AND METHOD FOR DISINFECTING WATER

BACKGROUND OF THE INVENTION

The present invention relates to an apparatus and a method for disinfecting water with on-site production of oxidizing/disinfectant products.

The generic term "water" is used to reference water to be disinfected, such as civil and industrial wastewater, cooling water of rivers, lakes or seas, potable waters and process water in general.

Water disinfection is necessary in order to prevent the proliferation of organisms, such as pathogen and environmental bacteria, fungi, algae, which can cause hygienic and sanitary problems or problems in terms of lack of efficiency of systems.

At least three different chemical reactions for obtaining disinfectant/oxidizing chemical products for water disinfection from reagents are known:

a transformation reaction of sodium chlorite and hydrochloric acid into chlorine dioxide, sodium chloride and water;

a transformation reaction of sodium chlorite in the presence of sulphuric acid to yield chlorine dioxide, sodium chloride, sodium sulphate and water;

and finally a transformation reaction of sodium chlorate, sodium chloride and sulphuric acid into chlorine dioxide, chlorine, sodium sulphate and water.

Methods and apparatuses for producing chlorine dioxide are known.

For example, U.S. Pat. No. 4,534,952 discloses the on-site generation of chlorine dioxide in a confined reaction region filled with the reagents necessary for its generation. Such reaction region is at a pressure that is sufficient to prevent the chlorine dioxide from forming a continuous gaseous phase, with the consequence of its possible explosion.

The method disclosed in U.S. Pat. No. 4,534,952 has the drawback that it is necessary to always maintain a pressure in the reaction medium in order to avoid the risk of explosions caused by the passage of the chlorine dioxide to the gaseous phase.

US-A-2003/0138371 (McWhorther et al.) discloses a method and an apparatus for generating gaseous mixes of chlorine dioxide and chlorine produced by reacting an inorganic acid with an aqueous solution of an alkaline metal chlorate by controlled introduction of the inorganic acid in the aqueous solution of the alkaline metal chlorate. The disinfectant product, together with steam, is formed in a head space of a reactor, from which it is removed and dissolved in water to obtain a product stream.

US-A-2003/0138371 discloses a method specifically aimed at creating a product for making potable water which should have no byproducts that are noxious to living organisms. Such method has the consequent complication of having to remove the disinfectant product by gaseous means.

US-A-2005/0244328 discloses a reactor and a method for the production of chlorine dioxide gas wherein the reactants react in a reaction chamber that operates under elevated pressure and within a specified temperature range.

A problem of such system is constituted by the fact that an excessive pressure is deleterious to the stability of chlorine dioxide.

Another problem is constituted by the safety issues generated by operating at high pressure.

OBJECTS OF THE INVENTION

The aim of the present invention is to provide an apparatus and a method for disinfecting water that allows to obtain, at different concentrations according to specific requirements of application, chemical products for disinfection directly on-site and immediately at the time of use.

An object of the invention is to produce the mixture of oxidizers/disinfectants in the reactor in constant and controlled pressure conditions, independently of the external pressure of the medium in which the reactor is immersed.

A further object of the invention is to increase the inherent safety of the system by preventing excessive pressures from being able to induce decomposition and disproportionation of the mixture of the products.

A further object of the present invention is to provide an apparatus which, by virtue of its particular constructive characteristics, is capable of giving the greatest assurances of reliability and safety in use.

SUMMARY OF THE INVENTION

This aim and these and other objects that will become better apparent hereinafter are achieved by an apparatus for disinfecting water, comprising at least one primary reactor supplied with chemical reagents and suitable to generate disinfectant and oxidizing products, characterized in that it includes at least one secondary reactor supplied with water and suitable to introduce, in water to be disinfected, the disinfectant and oxidizing products mixed with the supplied water, the primary and secondary reactors being immersed in the water to be disinfected.

BRIEF DESCRIPTION OF THE DRAWINGS

Further characteristics and advantages will become better apparent from the description of preferred but not exclusive embodiments of the invention, illustrated by way of non-limiting example in the accompanying drawings, wherein.

DETAILED DESCRIPTION

Figure 1:
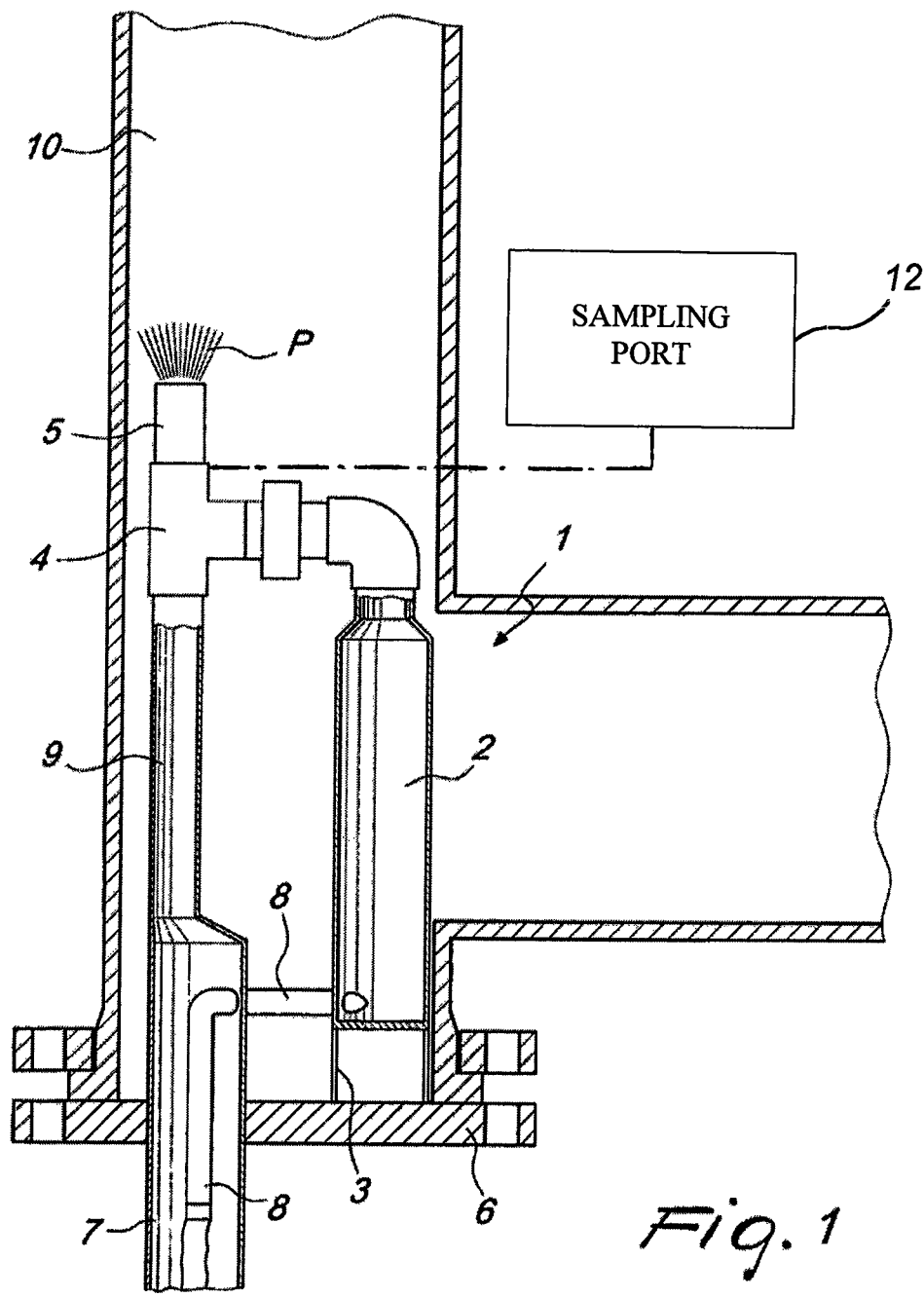
FIG. 1 is a schematic front view of a generator of disinfectant and oxidizing products inserted in a pipe in which water to be disinfected flows.

With reference to the cited figures, the apparatus according to the invention, generally designated by the reference numeral 1, comprises a primary reactor 2, which is associated with a supporting plate 6, by means of a support 3, and is connected to a secondary reactor 4, which includes an ejector 5 from which the product P exits at the desired concentration.

The reagents are fed to the primary reactor 2 by means of a tubular structure 7, which passes through the supporting plate 6 and is fastened thereto. The tubular structure 7 contains one or more flexible tubes 8, only one of which is shown in the figures.

The tubular structure 7 is connected to a feeding duct 9, which is adapted to feed water to the secondary reactor 4.

The flexible tubes 8 in which the reagents, supplied by pumps connected to the corresponding storage tanks not visible in the figures, flow, are then inserted in the tubular structure 7 in which the water flows.

In practice, the number of reagents and of corresponding storage tanks can be other than two.

In the water supply duct 9, in the initial part 7 of which the flexible tubes 8 for supplying the reagents are inserted, the supply water flows with such a flow as to meet the following conditions:

a) the concentration of the oxidizing/disinfectant product is comprised between 0.1 and 5 grams/liter and preferably between 0.5 and 2 grams/liter;

b) the pressure p1 of the water in the water supply duct 9 has such a value that, with respect to the pressure p of the water to be treated, there is a positive difference comprised between 1 and 10 bars and preferably between 2 and 4 bars.

The apparatus is provided with a sampling port 12 at the outlet of the secondary reactor 4. The sampling port is useful for drawing the chlorine dioxide solution in order to check its analytical purity.

The reaction chamber of the primary reactor 2 preferably has a volume comprised between 3 ml and 4000 ml.

The reaction chamber of the primary reactor 2 is sized as a function of the product to be obtained and of its quantities, so that there is a reaction time that varies between 5 and 1200 seconds and preferably between 15 and 300 seconds.

Figure 2:
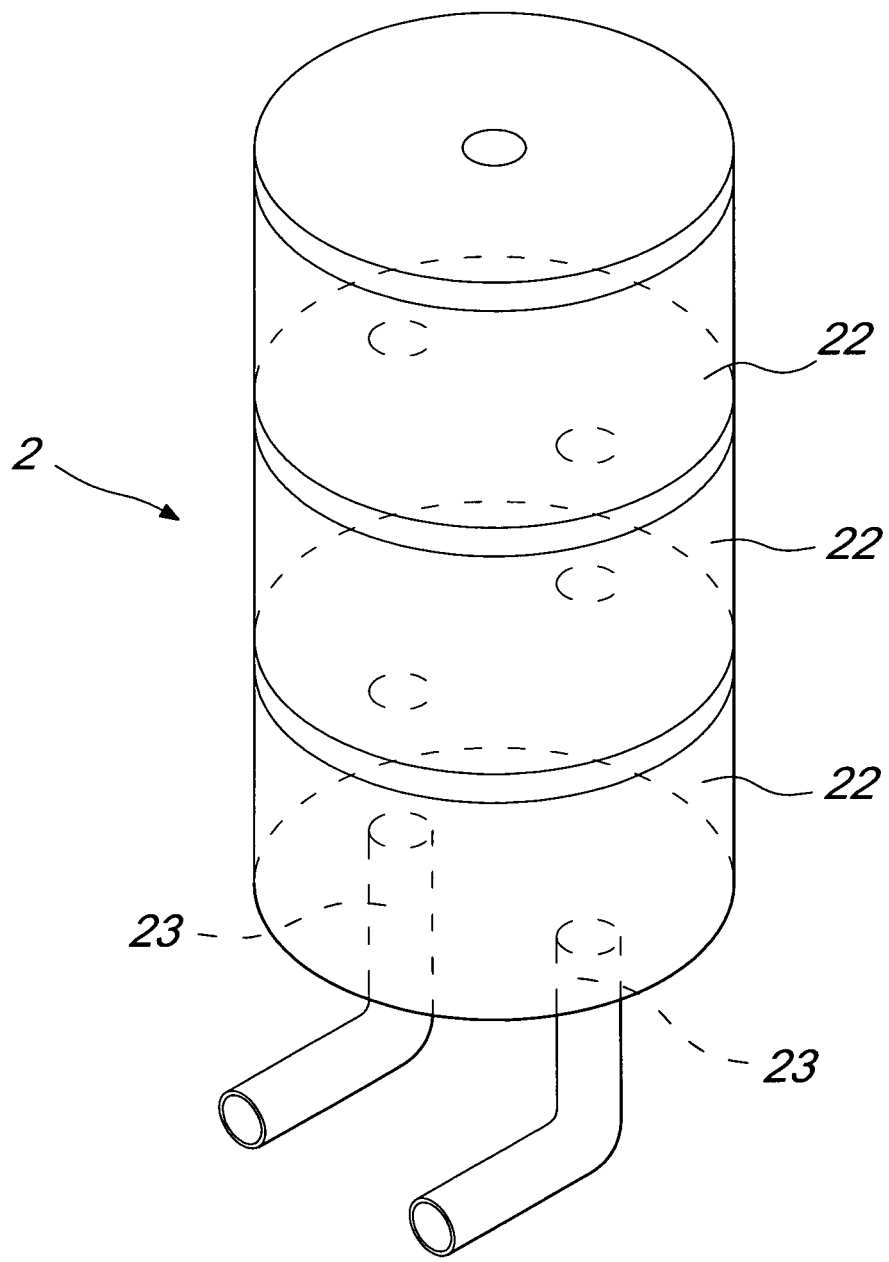
FIG. 2 is a schematic perspective view of an embodiment of the structure of the primary reactor.

In order to ensure flexibility in the hourly production of the oxidizing/disinfectant agent, the primary reactor 2 can be multistage, i.e., constituted by a plurality of modular chambers 22, as shown schematically in FIG. 2, or by a series of smaller chambers arranged in parallel and controlled by the secondary reactor 4 and by the corresponding ejector 5.

The geometry of the primary reactor 2 maximizes the efficiency of the reaction.

The primary reactor 2 preferably has a ratio of height to diameter comprised between 0.5 and 50 and preferably between 2 and 10.

The inner shape of the primary reactor 2 ensures the best mixing of the reagents and prevents an homogeneous situation between the reagents and the products (and therefore between the liquids and the dissolved gases); rather, going up from the inlet 23 of the reagents, the gas phase/liquid phase ratio increases, i.e. the product/reagent ratio increases.

Optionally, the primary reactor 2 has a chamber for pre-dilution of the sulphuric acid (not shown in the figures).

The materials used for making the chambers of the primary reactor 2 ensure perfect compatibility with the solutions of disinfectant/oxidizer, as well as mechanical strength; preferred material are, for example, PVC, PTFE, PVDF, PRFV, glass, etc.

The generator is capable of producing from 10 grams per hour to 200 kg per hour of oxidizer/disinfectant and preferably from 20 grams to 100 kg per hour.

The primary reactor 2 is followed by the secondary reactor 4, which provides a mixing chamber for the dilution of the oxidizers/disinfectants with water, in order to maintain the required high safety standards, up to the conditions cited earlier.

The oxidizing/disinfectant product, obtained after dilution with water, exits from the secondary reactor 4 dissolved in a liquid phase at suitable concentrations and is immediately in contact with the water to be treated, which flows in the pipe 10 in which the apparatus is inserted.

The industrial, potable, process water etc. can be introduced in the generator to dilute the products that have formed to the desired concentration or to dilute appropriately the concentration of the reagents.

In this last case it is preferable to use water that is free from need of disinfectant even of a different nature from the one to be treated.

The apparatus according to the present invention generates a highly pure solution of chlorine dioxide or of mixtures of chlorine dioxide and chlorine according to the stoichiometric values listed hereafter.

$$5NaClO_2+4HCl \rightarrow 4ClO_2+5NaCl+2H_2O \qquad (1)$$

$$5NaClO_2+2H_2SO_4 \rightarrow 4ClO_2+2Na_2SO_4+NaCl+2H_2O \qquad (2)$$

$$2NaClO_3+2NaCl+2H_2SO_4 \rightarrow 2ClO_2+Cl_2+2Na_2SO_4+2H_2O \qquad (3)$$

Therefore, the present invention mainly uses at least one of the following chemical reactions to obtain disinfectant/oxidizing chemical products for the disinfection of water, from reagents: a transformation reaction of sodium chlorite and hydrochloric acid into chlorine dioxide, sodium chloride and water, a transformation reaction of sodium chlorite in the presence of sulphuric acid to yield chlorine dioxide, sodium chloride, sodium sulphate and water, and finally a transformation reaction of sodium chlorate, sodium chloride and sulphuric acid into chlorine dioxide, chlorine, sodium sulphate and water.

The term "purity", not too to be confused with conversion or efficiency of the reaction, is used herein to refer to the absence of impurities produced or carried by the generation system: such impurities are generated by parasitic reactions that occur in parallel to the ones cited above and can involve both the reagents and the products.

As regards reactions (1) and (2), that produce only chlorine dioxide as a disinfectant/oxidizing agent, purity is understood here as the absence of unwanted impurities (chlorite, chlorate, chlorine) in the produced solution of chlorine dioxide. Chemically, such purity is determined by means of a complete analysis of the solution, which entails determining the chlorine dioxide and chlorine (by iodometric titration with neutral and acid pH—AWWA Standard Methods 4500—$ClO_2$), chlorite and chlorate (by ion chromatography—EPA 300.1—after degassing the solution) and expressed as a difference between 100 and the summation of the percentage ratios between the concentration of the individual impurities and the concentration of the chlorine dioxide.

In the case of reaction (3), where a mixture of chlorine dioxide and chlorine is produced which can be used for applications that do not involve treatments of water intended for human consumption, it is more appropriate to speak of chlorate conversion, understood as production of the two oxidizing agents in the molar ratio indicated by the reaction and the simultaneous absence of chlorate in the final mixture.

The reagents can be formulated conveniently according to the requirements and can be the following:

sodium chloride in solution (2% to 35%) and preferably 10% to 30% sodium chlorite in solution (3% to 33%) and preferably 8 to 31% sodium chlorate in solution (3% to 50%) and preferably 25 to 40% hydrochloric acid in solution (3% to 37%) and preferably 10 to 33% sulphuric acid in solution (3% to 98%) and preferably 50 to 98%

The percentages are understood as weight/weight.

Some ways of carrying out the invention are presented hereinafter by means of examples.

EXAMPLE 1

An aqueous solution containing 25% sodium chlorite and an aqueous solution of 33% hydrochloric acid are prepared. The solutions are introduced in the respective tanks and, by means of the dosage pumps, the flow of the two reagents is adjusted so that there is a chlorite:acid ratio of 1:0.8 by volume. The two reagents are sent, in the indicated ratios and in the quantities required for disinfection, to the 150-ml reaction chamber, where they remain for the time needed to complete the reaction, which is comprised between 15 and 30 seconds. The ejector is supplied with water, with no demand for oxidizer, at a pressure of 4 bars, and a counterpressure of 1.5 bars (pressure in the pipe of the water to be treated) is applied at the output. The flow-rate of the driving water is such as to dilute the chlorine dioxide to a concentration of approximately 1 g/l. Upon analysis, the solution has the following composition:

$ClO_2$=1083 mg/l; chlorite=absent; chlorine=absent; chlorate=26 mg/l.

Purity is therefore equal to 97.6%. The produced chlorine dioxide is thus used in the process for pre-oxidation of an unprocessed basin water to be rendered potable, which has a chlorine dioxide demand of 1.5 mg/l at 2 hours, which represents, at that flow rate, the retention time in the pre-oxidation tank, with the goal of facilitating the clariflocculation process, modifying the structure of the dissolved organic molecules and ensuring the hygienic and sanitary level required for water intended for human consumption.

The main characteristics of the described example, including the bacterial count in input and in output, are listed in the accompanying table I.

TABLE I a

| Hourly flow-rate of circuit mc/h | Chlorite dosage l/h | Hydrochloric acid dosage l/h | Production $ClO_2$ kg/h |
|---|---|---|---|
| 1525 | 12.7 | 10.1 | 2.29 | b

| Total coliforms cfu/ml unprocessed | Total coliforms cfu/ml processed | *Escherichia coli* cfu/100 ml unprocessed | *Escherichia coli* cfu/100 ml processed |
|---|---|---|---|
| 4250 | absent | 1200 | absent |

EXAMPLE 2

An aqueous solution containing 25% sodium chlorite and an aqueous solution of 33% hydrochloric acid are prepared. The solutions are introduced in the respective tanks and, by means of the dosage pumps, the flow of the two reagents is adjusted so that there is a chlorite:acid ratio of 1:0.8 by volume. The two reagents are sent, in the indicated ratios and in the quantities required for disinfection, to the 30-ml reaction chamber, where they remain for the time needed to complete the reaction, which is comprised between 15 and 30 seconds. The ejector is supplied with water, with no demand for oxidizer, at a pressure of 7 bars, and a counterpressure of 4 bars (pressure in the pipe of the water to be treated) is applied at the output. The flow-rate of the driving water is such as to dilute the chlorine dioxide to a concentration of approximately 1.2 g/l. Upon analysis, the dioxide solution has the following composition:

$ClO_2$=1224 mg/l; chlorite=absent; chlorine=8 mg/l; chlorate=30 mg/l.

Purity is therefore equal to 96.9%.

The produced chlorine dioxide is thus used for coverage of a water network where water that has already been rendered potable with a 0.5 mg/l dosage, with the goal of keeping the hygienic-sanitary characteristics of the water unchanged and prevent dangerous microbiological re-growth.

The main characteristics of the described example are listed in the accompanying table II.

TABLE II

| Hourly flow-rate of circuit mc/h | Chlorite dosage l/h | Hydrochloric acid dosage l/h | Production $ClO_2$ kg/h |
|---|---|---|---|
| 1000 | 2.8 | 2.2 | 0.5 |

EXAMPLE 3

An aqueous solution containing 31% sodium chlorite and an aqueous solution of 33% hydrochloric acid are prepared. The solutions are introduced in the respective tanks and, by means of the dosage pumps, the flow of the two reagents is adjusted so that there is a chlorite:acid ratio of 1:1 by volume. The two reagents are sent, in the indicated ratios and in the quantities required for disinfection, to the 1200-ml reaction chamber, where they remain for the time needed to complete the reaction, which is comprised between 15 and 30 seconds. The ejector is supplied with water, with no demand for oxidizer, at a pressure of 3 bars, and a counterpressure of 0.5 bars (pressure at the depth of the dosage point) is applied at the output. The flow-rate of the driving water is such as to dilute the chlorine dioxide to a concentration of approximately 1.8 g/l. Upon analysis, the solution has the following composition:

$ClO_2$=1815 mg/l; chlorite=absent; chlorine=absent; chlorate=65 mg/l.

Purity is therefore equal to 96.4%. The produced chlorine dioxide is thus used as an antifouling agent in the treatment of seawater used for the cooling circuit of a thermal power station. The system is programmed to perform dosage twice a day for 1 hour each, at a concentration that meets the water demand estimated earlier at 0.8 mg/l. The main characteristics of the described example, including the bacterial count in input and in output, are given in the accompanying Table III.

TABLE III a

| Hourly flow-rate of circuit mc/h | Chlorite dosage l/h | Hydrochloric acid dosage l/h | Production $ClO_2$ kg/h |
|---|---|---|---|
| 25000 | 84.5 | 84.5 | 20 | b

| Total aerobic count cfu/ml unprocessed | Total aerobic count cfu/ml heat exchanger output |
|---|---|
| 3760 | 215 |

EXAMPLE 4

An aqueous solution containing 25% sodium chlorate and 13.5% sodium chloride (mixture A) and a solution of concentrated sulphuric acid, which will be diluted subsequently to the desired concentration, equal to 75%, in the premixing chamber having a volume of 10 ml, are prepared. By means of the dosage pumps, the flow is adjusted so that there is a 1:1.05 ratio between the mixture and the concentrated sulphuric acid. The two reagents are sent, in the indicated ratios and in the quantities required for disinfection, to the 150-ml reaction chamber, with a reaction time comprised between 20 and 90 seconds.

The conversion yield of reaction (3) is 95% higher than chlorate. The molar ratio between chlorine dioxide and chlorine is 1.92.

The ejector is supplied with water, with no demand for oxidizer, at a pressure of 3 bars, and a counterpressure of 0.5 bars (pressure at the depth of the dosage point) is applied at the output. Upon analysis, the solution has the following composition:

$ClO_2$=650 mg/l; chlorite=absent; chlorine=356 mg/l; chlorate=38.2 mg/l.

The mixture of disinfectants (chlorine and chlorine dioxide) produced, suitably diluted with dilution water, is thus used for the disinfection/antifouling treatment of surface water for industrial use. This is a continuous dosage equal to approximately 0.2 mg/l of total disinfectant. The main characteristics of the described example, including the bacterial count in input and in output, are given in the accompanying Table IV.

TABLE IV

| Hourly flow-rate of ciruit m3/h | Dosage of mixture A L/h | Concentrated sulphuric acid dosage L/h | Production $ClO_2$//$Cl_2$ g/h | Total aerobic count cfu/ml input | Total aerobic count cfu/ml output |
|---|---|---|---|---|---|
| 6000 | 3.83 | 3.92 | 789//411 | 35000 | 1500 |

EXAMPLE 5

An aqueous solution containing 16% sodium chlorite and 20% sodium chloride (mixture A) and a solution of 50% diluted sulphuric acid are prepared. By means of the dosage pumps, the flow is adjusted so that there is a 1:0.8 ratio between the mixture and the sulphuric acid. The two reagents are sent, in the indicated ratios and in the quantities required for disinfection, to the 1500-ml reaction chamber, with a reaction time comprised between 5 and 50 seconds.

The ejector is supplied with water, with no demand for oxidizer, at a pressure of 3 bars, and a counterpressure of 0.5 bars (pressure at the depth of the dosage point) is applied at the output. The flow-rate of the driving water is such as to dilute the chlorine dioxide to a concentration of approximately 1.4 g/l. Upon analysis, the solution has the following composition:

$ClO_2$=1432 mg/l; chlorite=absent; chlorine=12 mg/l; chlorate=23 mg/l.

Purity is therefore equal to 97.6%. The produced chlorine dioxide is thus used as antifouling agent in the treatment of seawater used for the cooling circuit of a thermal power station. The dosage, equal to 0.28 mg/l, is continuous with respect to an average value of the chlorine dioxide demand of the unprocessed water at 30 minutes of 0.8 mg/l. The main characteristics of the described example, including the bacterial count in input and in output, are given in the accompanying Table V.

TABLE V

| Hourly flow-rate of ciruit mc/h | Dosage of mixture A l/h | Sulphuric acid dosage kg/h | Production $ClO_2$ kg/h | Total aerobic count cfu/mL input | Total aerobic count cfu/mL output |
|---|---|---|---|---|---|
| 30000 | 72 | 57.7 | 8.4 | 15000 | 300 |

The present invention therefore relates to a submerged generator which, by using a series of possible precursors, independently of the pressure applied by the fluid in which it is immersed, operate at pressures that are conveniently reduced so as to maximize the reaction kinetics and the purity of the generated solution.

The achieved operating conditions offer the benefit of working with an increase in the inherent safety of the system, since the chlorine dioxide in gaseous phase never reaches conditions that might become critical.

The generator is capable of working with great flexibility, maintaining the same efficiency and safety independently of productivity, because of the possibility to work with a single chamber or in multistage mode or in parallel.

In practice it has been found that the invention achieves the intended aim and objects, providing a method and an apparatus that allow to obtain an oxidizing/disinfectant product that is already dissolved in the liquid phase in the concentrations desired in the water to be subjected to disinfection.

The apparatus, and particularly the primary reactor 2, has been designed conveniently so as to obtain the maximum reaction speed, the best control of reaction kinetics, the best stability of the finished product, the minimization of the forming of impurities and the increase in the safety of the system.

The design parameters that allow to achieve this aim are the adjustment of the contact times, the maintenance of a correct and constant ratio between the gaseous phase and the liquid phase, temperature control and the maintenance of appropriate pressure conditions.

The apparatus according to the present invention has several important advantages over the prior art systems.

The apparatus is configured to prevent the onset of excessive pressure that would be noxious to the stability of the chlorine dioxide.

The apparatus according to the present invention does not pose safety issues associated with operating at higher pressure.

According to the present invention, the apparatus is configured to adapt to any pressure condition of the fluid surrounding the reaction chamber, be it very low, such as in a basin, or very high, such as in a water main or pipe.

Also, the ejector 5 regulates the pressure and provides a constant and uniform flow of the chlorine dioxide from the reaction chamber of the primary reactor to the mixing chamber, constituted by the secondary reactor, and the water is thus treated uniformly with an appropriate dose, contrary to what might happen in a conventional apparatus provided with a valve which opens simply when an inner pressure threshold is reached.

This application claims the priority of Italian Patent Application No. MI2007A002388, filed on Dec. 19, 2007, the subject matter of which is incorporated herein by reference.

The invention claimed is:

1. A method for disinfecting water by means of at least one of the following reactions: a transformation reaction of sodium chlorite and hydrochloric acid into chlorine dioxide, sodium chloride and water; a transformation reaction of sodium chlorite in the presence of sulfuric acid to yield chlorine dioxide, sodium chloride, sodium sulfate and water; and a transformation reaction of sodium chlorate, sodium chloride and sulfuric acid into chlorine dioxide, chlorine, sodium sulfate and water; the method comprising introducing the reagents into a primary reactor immersed in water to be disinfected; generating disinfectant and oxidizing products from said reagents in said primary reactor; feeding said disinfectant and oxidizing products to a secondary reactor spaced from said primary reactor and immersed in water to be disinfected; feeding water to said secondary reactor via a supply duct extending to said secondary reactor through said water to be disinfected; and mixing said disinfectant and oxidizing products with water in said secondary reactor, the method further comprising regulating the pressure in said primary reactor and providing a constant and uniform flow of chlorine dioxide from a reaction chamber of said primary reactor to said secondary reactor, by means of an ejector.

\* \* \* \* \*